United States Patent [19]

Collins

[11] 4,197,549

[45] Apr. 8, 1980

[54] SLOT ANTENNA

[75] Inventor: Gerald W. Collins, Quincy, Ill.

[73] Assignee: Harris Corporation, Cleveland, Ohio

[21] Appl. No.: 825,310

[22] Filed: Aug. 17, 1977

[51] Int. Cl.[2] .............................................. H01G 13/12

[52] U.S. Cl. ...................................... 343/771; 343/791

[58] Field of Search ............... 343/767, 768, 770, 771, 343/791, 792

[56] References Cited

U.S. PATENT DOCUMENTS

| | | | |
|---|---|---|---|
| 2,477,510 | 7/1949 | Chu | 343/771 |
| 2,658,143 | 11/1953 | Fiet et al. | 343/771 |
| 2,660,674 | 11/1953 | Brown | 343/771 |
| 2,665,381 | 1/1954 | Smith et al. | 343/771 |
| 2,724,774 | 11/1955 | Fiet | 343/771 |
| 2,803,008 | 8/1957 | Lindenblad | 343/771 |
| 2,954,556 | 9/1960 | Yang | 343/770 |
| 3,417,400 | 12/1968 | Black | 343/771 |
| 3,581,311 | 5/1971 | Kach | 343/791 |

*Primary Examiner*—Eli Lieberman

[57] ABSTRACT

A slot antenna having particular application to the field of UHF broadcasting. The antenna is comprised of a rigid coaxial waveguide which is dimensioned so that electromagnetic energy propagates therethrough in the $TE_{11}$ mode. Two longitudinal baffles are provided at diametrically opposing circumferential positions within the waveguide. These baffles stabilize the orientation of the mode (i.e., the mode polarization) within the waveguide so that it is known. Alternate methods of establishing a fixed mode polarization are also disclosed. Slots are provided along the exterior of the waveguide in appropriate circumferential positions relative to the mode polarization. Since the $TE_{11}$ mode includes both longitudinal and transverse current components, vertical, horizontal, or circular polarization may be generated through the selection of appropriate positions, shape, and orientations for the radiating slots. In one illustrated embodiment, orthogonal slots are provided at selected locations along the exterior of the cylinder so that circular polarization is transmitted by the antenna. The antenna is preferably center-fed through use of a coaxial feed line which is run along the center of the antenna to a center feed point. Various methods for coupling the electromagnetic energy from the coaxial feed line to the $TE_{11}$ waveguide are disclosed.

9 Claims, 8 Drawing Figures

SLOT ANTENNA

BACKGROUND AND FIELD OF THE INVENTION

The present invention relates to the art of antennas, and more particularly to a slot antenna having particular application in the field of UHF broadcasting.

Slotted cylinder antennas have been used effectively in UHF broadcasting since the early 1950's. These antennas remain the most popular transmitting antennas for these purposes because of the high gain associated therewith, as well as the simplicity of the feeding arrangement required and their ability to generate desired pattern shapes.

Prior art slotted cylinder antennas have been arranged and dimensioned so that the electromagnetic energy propagates along the interior of the radiating cylinder in either the TEM mode or the $TM_{01}$ mode. One of the reasons that these modes have been selected in the past is that they exhibit cylindrical symmetry. The exact position of the slots about the circumference of the radiating cylinder is, therefore, not critical. Also, although the current lines in the TEM mode are entirely longitudinal, horizontal polarization can still be generated with relative simplicity (in a vertically oriented slotted cylinder) through the provision of longitudinally extending slots, as long as a suitable coupling device (such as shown in Bazan U.S. Pat. No. 2,981,947) is provided for each slot. This is desirable because horizontal polarization is currently the accepted standard for UHF broadcasting.

There is disclosed herein, however, a slotted cylinder antenna wherein the selected mode of propagation within the radiating cylinder is the $TE_{11}$ coaxial mode. A number of advantages inhere in the use of this mode of propagation. The use of this mode allows the construction of a UHF antenna having a relatively small diameter, thereby providing a low windload of the antenna. Additionally, it is possible to center-feed an antenna employing this mode so as to thereby secure the many benefits associated with a center fed antenna. Yet another advantage of the use of this mode is that the transmission of circularly polarized signals may be easily provided for, merely through the provision of pairs of orthogonal slots at selected positions along the antenna. This is possible because the $TE_{11}$ mode includes both longitudinal and transverse current components. This is particularly important in view of the growing acceptance of circularly polarized antennas as a desirable alternative to conventional horizontally polarized antennas.

A problem associated with the use of the $TE_{11}$ mode relates to the non-symmetrical nature of the current lines about the antenna axis. Because of this lack of cylindrical symmetry, the relative positions of the mode and the slots is critical to the attainment of a predictable radiation characteristic. The orientation of the mode may wander within a coaxial waveguide of conventional construction, however, due to conductor imperfections, manufacturing tolerences, or discontinuities within the system. Consequently, the desired alignment between the slots and the mode is not readily achievable in these waveguides.

The present invention resolves this problem by structuring the coaxial waveguide so that a preferred field orientation exists. When structured thusly, the $TE_{11}$ mode will be fixed in a known orientation. It is therefore possible to position the slots in any desired alignment with respect to the mode polarization.

In accordance with the present invention, a slotted cylinder antenna is provided including a radiating structure which is constructed and dimensioned so that the electromagnetic energy will propagate therethrough in the $TE_{11}$ mode, and so that the mode polarization will remain fixed in a known orientation. The radiating structure is periodically interrupted by radiating slots which are positioned along the radiating structure so that the desired transmission polarization and radiation pattern are secured.

In accordance with another feature of the present invention, the radiating structure comprises a cylinder having a coaxial feed line disposed therein. The coaxial feed line runs along the center of the cylinder to the vicinity of the midpoint of the antenna, where a feed point is provided for exciting the $TE_{11}$ mode of propagation along the waveguide defined by the exterior of the coaxial feed line and the cylinder. Electrically conductive members are disposed at selected circumferential positions within the waveguide so as to establish a preferred field orientation for the $TE_{11}$ mode. Slots are provided at regular positions along the cylinder so as to radiate electromagnetic energy therefrom having a desired polarization sense and radiation pattern.

In accordance with yet another aspect of the present invention, orthogonal slots are provided along the radiating cylinder so that the polarization transmitted by the antenna is substantially circular or elliptical.

BRIEF DESCRIPTION OF THE DRAWINGS

The foregoing and other objects and advantages of the invention will become more readily apparent from the following description of a preferred embodiment, as taken in conjunction with the accompanying drawings which are a part hereof, and wherein.

DETAILED DESCRIPTION OF THE DRAWINGS

Reference is now made to the drawings, wherein the showings are provided for purposes of illustrating a preferred embodiment of the invention and are not intended to limit the breadth of the invention described. Thus, although the invention will be described with respect to a top-mount UHF broadcasting antenna, it will be appreciated that the invention has broader application to RF transmission and reception in general.

Figure 1:
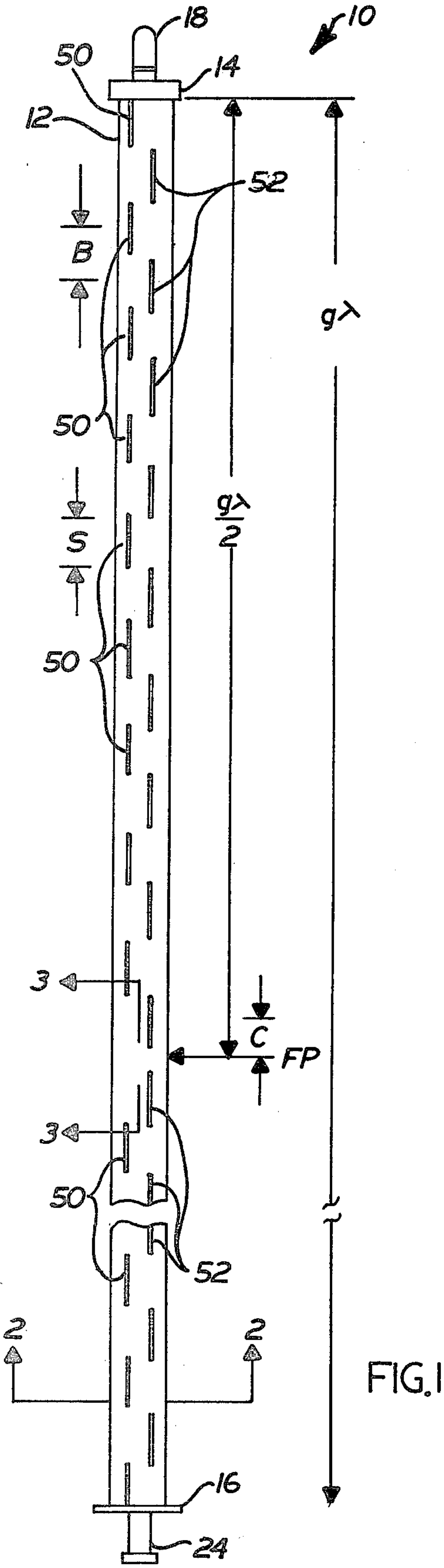
FIG. 1 is a elevation view of a slotted cylinder antenna in accordance with the teachings of the present invention.

In FIG. 1 there is shown an elevation view of a slotted cylinder antenna 10 in accordance with the teachings of the present invention. Antenna 10 includes a cylindrical radiating structure 12 bounded on the top and bottom by shorting plates or terminating loads 14 and 16. A warning beacon 18 may be provided at the upper extremity thereof. At the lower extremity, a mounting bracket may be provided for vertically mounting the antenna to the top of an antenna tower of conventional design.

Figure 2:
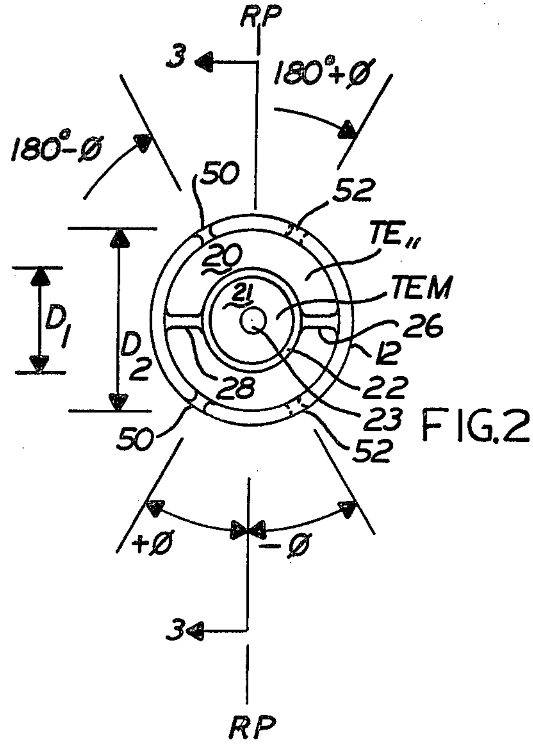
FIG. 2 is a transverse cross-sectional view of the antenna of FIG. 1, showing the disposition of the coaxial feed line therein.

As will be seen more clearly in FIG. 2, antenna 10 comprises three coaxially mounted cylinders 12, 22, and 23, together defining an outer coaxial waveguide 20 and an inner coaxial waveguide 21. The inner coaxial waveguide defined by cylinders 22 and 23 serves as a rigid coaxial feed line and runs from the center feed point (FP) of antenna 10 to beyond the end of the shorting plate 16. The center conductor 23 may be supported at the center of the middle cylinder 22 in any of the manners conventionally used in the construction of rigid coaxial transmission lines. The protruding bottom end 24 of the rigid coaxial feed line will be connected with the rigid coaxial feed line arriving from the transmitter (not shown). In this fashion, RF energy is directed from the transmitter to the antenna feed point located at the midpoint of antenna 10.

Although the inner coaxial waveguide is terminated in the vicinity of the feed point, the middle cylinder 22 extends the entire length of the antenna in order to maintain the coaxial nature of the outer waveguide 20. Shorting plates 14 and 16 serve to terminate the outer waveguide 20 at the upper and lower extremities by each electrically shorting cylinders 12 and 22 together.

In accordance with well-known principles, the outer diameter $D_1$ of middle cylinder 22 and the inner diameter $D_2$ of outer cylinder 12 are selected so that, at the frequencies being broadcast by this antenna, the $TE_{11}$ mode is propagated through coaxial waveguide 20. This will result in an antenna having a relatively small diameter (approximately half a wavelength), and a correspondingly low windload. Since the $TE_{11}$ mode does not have cylindrical symmetry, the radiation characteristics of the antenna will depend largely upon the orientation of the propagating mode (i.e., the mode polarization) with respect to the orientation of the broadcasting slots. To insure that a desired relative orientation is achieved, some means must be provided for establishing a known and unchanging mode polarization.

In the illustrated embodiment, a preferred field orientation is established through use of two baffles 26 and 28 which are located at diametrically opposed circumferential positions within waveguide 20. The orientation of these baffles may be seen most clearly in FIG. 2. Baffles 26 and 28 are comprised of planer strips of electrically conductive material, and extend the length of antenna 10 substantially without interruption. Because these baffles electrically connect middle cylinder 22 with outer cylinder 12, boundary conditions are established which fix the orientation of the propagating mode within the waveguide. With the field orientation thus established, the position of the slots may be carefully selected to cut across current lines in any desired manner.

Use of the two baffles effectively creates two half cylindrical waveguides, each propagating half of the $TE_{11}$ mode. Hence, it is not proper, strictly speaking to refer to the mode by the $TE_{11}$ notation. However, for thin baffles the propagation characteristics are not materially effected, and in practice the propagation may be considered to be in the $TE_{11}$ mode.

Many other methods of establishing this preferred field orientation could alternately be employed. For example, a preferred field orientation could be established by the simple expedient of providing the center conductor 20 with an elliptical cross-section, rather than the circular cross-section shown. Alternately, ridges could be placed along the outer surface of the middle conductor or along the inner surface of the outside cylinder 12 at positions orthogonal to the positions occupied in the illustrated embodiment by the baffles 28 and 26. Yet another possible method of establishing a preferred field orientation would be to use a number of properly spaced pins in place of each of the solid baffles. Each of these methods will function to establish a preferred field orientation, while also providing suppression of the TEM mode.

As in rigid coaxial waveguides currently in use, electromagnetic energy will propagate through waveguide 21 in the TEM mode. The arrangement used to feed this energy to the outer waveguide 20 will in part depend upon the method used for fixing the mode polarization. Although all of the described methods of establishing the mode polarization will result in similar electric and magnetic field patterns within the outer waveguide, the use of continuous baffles would serve to completely isolate the two sections of the waveguide located on either side of the baffles. Consequently, if baffles are used, the two halves of the outer waveguide must each be provided with a separate feed arrangement. On the other hand, only a single feed arrangement need be provided if any of the other described methods are employed, since all of these methods allow coupling to occur between the two halves of the waveguide.

Figure 3:
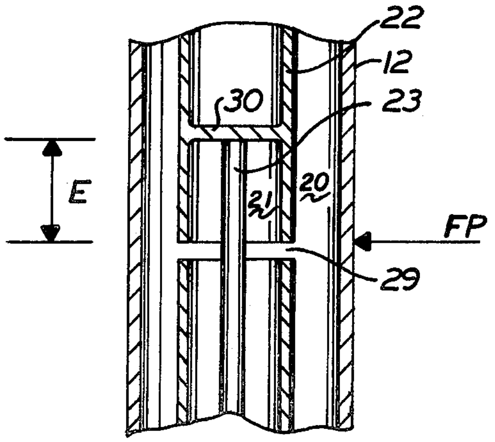
FIG. 3 is a longitudinal cross-sectional view of the antenna of FIG. 1, showing a preferred feeding method therefor.

There is illustrated in FIG. 3 a preferred feed arrangement for use when baffles are employed for fixing the mode polarization. This feed arrangement comprises an annular slot 29 circumferentially located about the middle cylinder 20, in the vicinity of the longitudinal midpoint (FP) of the antenna. The annular slot will extend entirely about the circumference of the middle cylinder, except at the positions occupied by the baffles 28 and 26. The inner coaxial waveguide 21 will be terminated by a shorting plate 30 at a short distance E beyond the feed slot. This additional short section (nominally equal to approximately one-half wavelength) functions as a balun. As stated previously, however, the middle cylinder 22 extends the entire length of the antenna.

Figure 4:
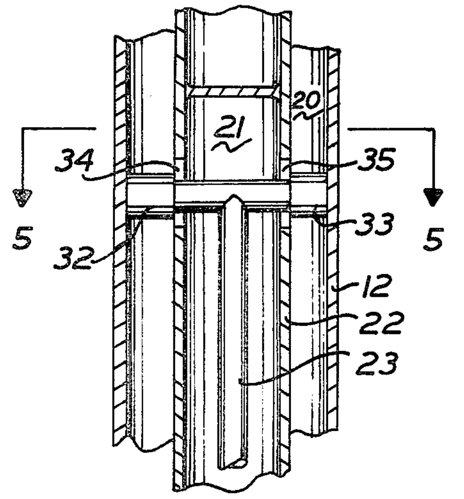
FIGS. 4 and 5 are illustrations of a second method of feeding the antenna of FIG. 1.
Figure 5:
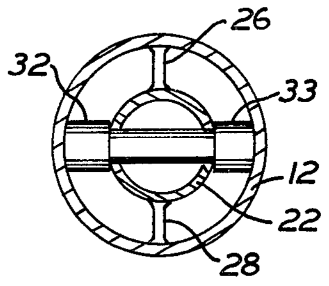

A second method of feeding the slot antenna when continuous baffles are used for establishing the mode polarization is shown in FIGS. 4 and 5. In this embodiment, a monopole probe is provided for each of the two isolated sections of the $TE_{11}$ waveguide 20. The two monopole probes 32 and 33 extend from the center conductor 23 through respective circular holes 34 and 35 in middle conductor 22 and are shorted to outer conductor 12. The probes will excite either the $TE_{11}$ mode or the TEM mode, depending upon the configuration of the outer waveguide. Since baffles 26 and 28 are included in the outer waveguide, the TEM mode will be suppressed and a pure $TE_{11}$ mode will propagate.

Figure 6:
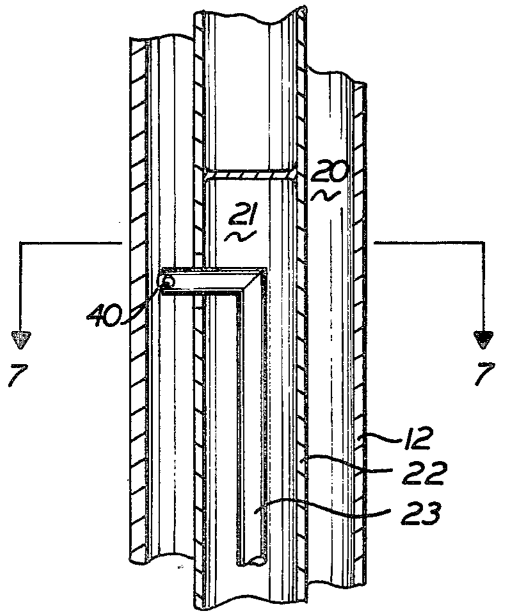
FIGS. 6 and 7 are illustrations of a third method of feeding the antenna of FIG. 1; and, FIG. 8 is an elevation view of a circularly polarized slot antenna in accordance with the teachings of the present invention.
Figure 7:
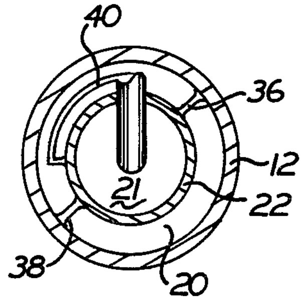

FIGS. 6 and 7 illustrate a third feed arrangement. In FIG. 7, the elements identified by reference numbers 36 and 38 are intended to represent pins, rather then continuous baffles. Since electromagnetic coupling will, therefore, occur between the two halves of outer waveguide 20, only a single feed arrangement need be provided. This configuration utilizes magnetic coupling between the feed line and the $TE_{11}$ waveguide 20. A loop 40 extends from the center conductor 23 through a circular hole in middle conductor 22 and attaches to the periphery of middle conductor 22. This loop couples to the magnetic fields of the $TE_{11}$ mode.

If continuous baffles were employed in place of pins 36 and 38, dual loops could be used to provide coupling to each of the isolated sections of outer waveguide 20, as in the first two feed arrangements. Similarly, if either of the first two feed arrangements were used with an antenna where coupling occurred between the two halves of the $TE_{11}$ waveguide, only one-half of the described feed arrangements would be required.

The antenna thus constructed will, of course, be provided with slots cut in the outer cylinder 12 so as to provide the antenna with preselected radiation characteristics. The number, spacing, shape, and dimensions of these slots will vary in accordance with the specific radiation requirements of each antenna.

It is a property of the $TE_{11}$ mode that both longitudinal and transverse current components are present. Assuming the axis of the antenna is vertically oriented, a slot provided at a position which intercepts longitudinal current lines (i.e., a transverse slot), will radiate vertically polarized electromagnetic signals. Similarly, a slot oriented in such a manner as to intercept the transverse current lines will radiate horizontally polarized signals. If a slot is provided in each of these orientations, then both vertically and horizontally polarized electromagnetic signals will be radiated by the antenna. Since it is also a property of the $TE_{11}$ mode that the longitudinal and transverse currents are always in phase quadrature, the vertically and horizontally polarized signals radiated by the respective slots will also be in phase quadrature. Consequently, an elliptically polarized electromagnetic signal will result.

At any given instant in time, the phase and amplitude of both current components (longitudinal and transverse) will be found to vary as a function of both longitudinal and circumferential position along the antenna. In the longitudinal direction, the phase and amplitude of the two current components will vary sinusoidally and in phase quadrature with axial position and with a periodicity of one guide wavelength. The orientation of amplitude and phase variations in the circumferential direction will be fixed by the presence of the baffles. Thus, a reference plane RP (FIG. 2) may be defined which is orthogonal to the plane of the baffles. The transverse current component will vary in phase and amplitude as a function of the sine of the circumferential angle $\phi$ from the reference plane RP, while the longitudinal current component will vary in phase and amplitude as a function of the cosine of the circumferential angle $\phi$ from the reference plane RP. The two components will thus always be in phase quadrature, as stated previously.

The embodiment illustrated in FIGS. 1 and 2 includes an array of longitudinally extending slots so that horizontally polarized signals are radiated therefrom. In order for the transmitted beam to have a wavefront which extends broadside to the antenna, the slots must be positioned so that the signals radiated from all of the slots will be in-phase. This may be accomplished by providing slots 50 equally spaced by approximately one guide wavelength along the length of the antenna, where each of the slots is located at the same circumferential angle $+\phi$, with respect to the reference plane RP.

In order to prevent the grating lobes which would otherwise exist due to the high slot spacing of slots 50, additional, intermediately spaced slots 52 may be provided. Slots 52 are axially spaced apart from slots 50 by approximately one-half of a guide wavelength. If slots 52 were provided at the same angular positions $+\phi$, as slots 50, the signals radiated thereby would be in phase opposition with the signals radiated by slots 50. To prevent this, slots 52 are instead located at an angular position $-\phi$, with respect to the reference plane RP. Since, it will be recalled, the transverse current component varies in phase and amplitude with respect to the reference plane as a sine function, the signal radiated by a slot at $-\phi$, will have the same amplitude but opposite phase of a signal radiated by the same slot positioned at $+\phi$. The total phase displacement between slots 50 and 52 will thus be 360° so that the signals radiated thereby will be in phase, as required.

Since the signals propagating along the upper and lower sections of antenna 10 have even symmetry with respect to feed point FP, proper phasing of the upper and lower portions of antenna 10 may be insured by providing slots 50 and 52 at (even) symmetrical positions on either side of feed point FP. The first slots on either side of feed point FP will be displaced therefrom by a distance C. This distance, which will generally be less than one-half wavelength, will be selected to be as close as possible to feed point FP without coupling to the undesirable modes which exist in the immediate vicinity of the feed point.

The antennas horizontal pattern may be controlled by adjusting the circumferential positions $\phi$ of the slots. For an omnidirectional horizontal pattern, slots will be cut into the $TE_{11}$ waveguide at four equally spaced circumferential positions about the antenna. To insure that proper phasing is maintained between slots, those slots located at $+\phi_1$ and $(180° - \phi_1)$ will be provided at common longitudinal positions, while those slots located at $-\phi_1$ and $(180° + \phi_1)$ will be located at other common longitudinal positions which are spaced from the first longitudinal positions by a distance B of approximately one-half of a wavelength.

As is well-known, the conductance of the slots will vary with the position of the slots $\phi$ with respect to the center of the waveguide (in this case, the reference plane RP). As is also well-known, phase shift of the wave propagating within the $TE_{11}$ waveguide will vary with the conductance of the slots. Since this, in turn, affects the slot phasing, it may be necessary to adjust the slot spacing B to compensate for phase shift introduced by the actual angular slot position $\phi$ employed. Furthermore, the longitudinal slot spacing can be adjusted so as to deliberately alter the slot phasing from the described resonant condition to account for beam tilt and for null fill. The manner in which these factors are taken into account in calculating the slot positioning is well-known and will not be dealt with herein.

Figure 8:
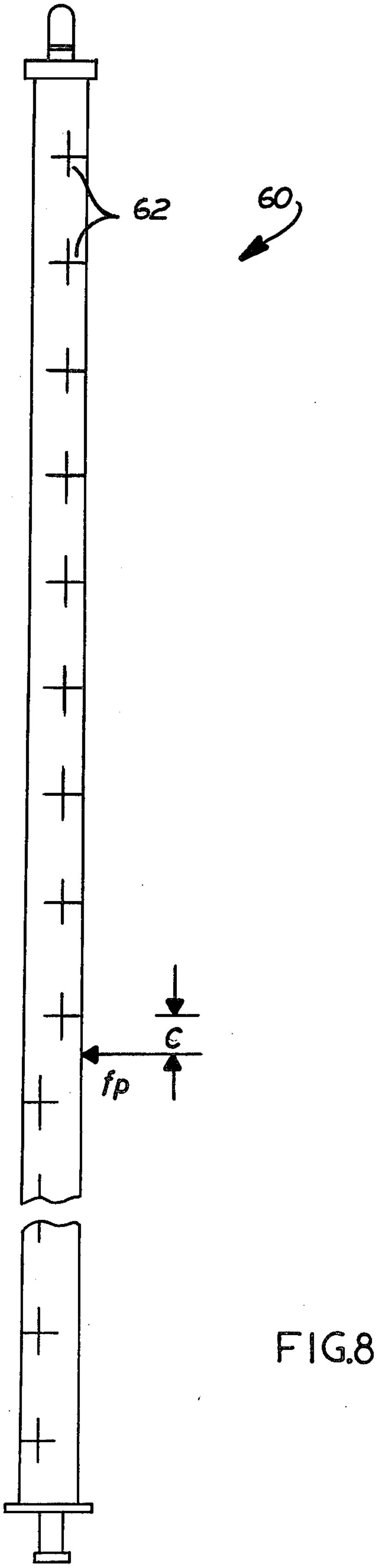

There is illustrated in FIG. 8 an embodiment 60 of the invention which employs crossed (orthogonal) slots 62 for broadcasting elliptically polarized signals. As state earlier, this is possible because the $TE_{11}$ mode includes both longitudinal and transverse current components. Furthermore, since these current components are always in phase quadrature, it is possible to provide the necessary quadrature phasing between the vertical and horizontal components of the elliptically polarized signal simply by cutting the crossed slots at the same longitudinal and transverse location along the antenna. This secures the further desirable feature that the horizontal and vertical components radiated by the two slots thus have a common phase center.

For crossed slots radiating a substantially circularly polarized wave, the energy radiated by a slot will be proportional to the length of the slot S, for any given angular waveguide position. The slot lengths along the array may thus be adjusted to provide any desired amplitude distribution.

The ellipticity of the radiated signal will depend, of course, upon the relative magnitudes of the horizontal and vertical components thereof. This ratio, commonly referred to as the axial ratio, may be adjusted by careful selection of the circumferential position $\phi$ at which the slots are located, it being noted that the relative magnitudes of the longitudinal and transverse current components will vary with circumferential position $\phi$.

As previously stated, slot locations along the antenna will be separated by approximately one guide waveguide. Unlike the previous embodiment, however, it is not possible to include intermediate slots at positions $-\phi_1$ on the other side of the reference plane. This is because, although the phase of the transverse current component shifts by 180° on either side of the reference plane, this is not the case with the longitudinal current component. The longitudinal current component varies with the cosine of the circumferential angle $\phi$, and thus has both the same magnitude and the same phase at corresponding angles on either side of the reference plane RP. Because of this although circular polarizaton will result from crossed slots on either side of the reference plane, the sense of the circular polarization (left-hand or right-hand circular polarization) will differ on the two sides of the reference plane.

It is therefore possible to radiate elliptical or circular polarization of either sense merely through a selection of the side of the reference plane upon which the slots are cut; slots may, however, only be placed on one side of the reference plane. Furthermore, if the baffles and the reference plane be considered as separating the antenna cross-section into four quadrants, the same sense of elliptical or circular polarization will result from crossed slots cut into diametrically opposing quadrants although the signals radiated therefrom would be in phase opposition if the crossed slots were provided at common longitudinal positions. To insure proper phasing, crossed slots provided in diametrically opposing quadrants must thus be spaced longitudinally one from the other by a distance of approximately one-half of a guide wavelength.

A remaining factor which must be considered is that the quadrants corresponding to each circular polarization sense will change at the feed point due to the even symmetry of the current components with respect to the feed point. For the radiation of a single circular polarization sense, then, the crossed slots must be cut into different quadrants on different sides of the feed point, as illustrated.

Depending on the polarization of the antenna, the total length of the antenna will be selected to be an integral number of guide wavelengths of half guide wavelengths. The number of slot positions provided (i.e., the number of "layers") will be selected in accordance with the desired gain of the antenna. These factors are well-known and are not believed to require elaboration.

Having thus described two possible embodiments of the present invention, no further effort will be made herein to catalog the various alternative slot positions and orientations which may be employed. The vast range of alternatives will be immediately apparent to those skilled in the art so that no additional showing will be necessary. It will, for example, be noted that the crossed slots shown in FIG. 8, although illustrated as oriented along longitudinal and transverse directions, need not necessarily be so oriented. As long as the slots are orthogonal, no specific disposition of the component slots is required. Furthermore, slots oriented at 45° with respect to the antenna axis will intercept both longitudinal and transverse current components, and, depending on their circumferential location, will radiate elliptically or circularly polarized waves.

In view of this it will be appreciated that although the present invention has been described with reference to preferred embodiments, any number of alterations therein may be made without departing from the spirit and scope of the invention, as defined in the appended claims.

What is claimed is:

1. A slot antenna for use in RF broadcasting comprising a coaxial waveguide including a hollow elongated outer conductor having a longitudinal axis and an elongated coaxially disposed inner conductor, said coaxial waveguide being structured and dimensioned so that electromagnetic energy within a selected frequency range will propagate therethrough in the $TE_{11}$ coaxial mode, and means extending into said coaxial waveguide for suppressing the TEM mode, whereby the current patterns along said waveguide will include components parallel to said longitudinal axis and components transverse to said axis, and so that said $TE_{11}$ mode will have a fixed mode polarization, whereby said parallel and transverse current components will occur at fixed locations along said waveguide, said coaxial waveguide having an array of slots formed along said elongated outer conductor with said slots being configured and positioned with respect to said mode polarization so that each of said slots will interrupt selected ones of said parallel and transverse current components, whereby selected polarizations are radiated therefrom, and means extending along said longitudinal axis for feeding said coaxial waveguide with RF electromagnetic energy within said selected frequency range.

2. A slot antenna as set forth in claim 1, wherein said feeding means comprises means for center feeding said coaxial waveguide.

3. A slot antenna for use in RF broadcasting comprising a coaxial waveguide including a hollow elongated outer conductor having a longitudinal axis and an elongated coaxially disposed inner conductor, said coaxial waveguide being structured and dimensioned so that electromagnetic energy within a selected frequency range will propagate therethrough in the $TE_{11}$ coaxial mode and so that said $TE_{11}$ mode will have a determinable mode polarization, said coaxial waveguide having an array of slots formed along said elongated outer conductor with said slots being configured and positioned with respect to said mode polarization so that selected polarizations are radiated therefrom, and means for feeding said coaxial waveguide with RF electromagnetic energy within said selected frequency range, wherein both said inner and outer conductor are generally tubular and have transverse dimensions selected so that electromagnetic energy within said selected frequency range will propagate therethrough in the $TE_{11}$ coaxial mode, said coaxial waveguide also including means for establishing a determinable $TE_{11}$ mode polarization within said waveguide and for also providing suppression of the TEM mode within said waveguide, and means for terminating said coaxial waveguide at both longitudinal ends thereof.

4. A slot antenna for use in RF broadcasting comprising a coaxial waveguide which is structured and dimensioned so that electromagnetic energy within a selected frequency range will propagate therethrough in the $TE_{11}$ mode and so that said $TE_{11}$ mode will have a determinable mode polarization, said coaxial waveguide having an array of slots formed thereon with said slots being positioned with respect to said mode polarization so that selected polarizations are radiated therefrom, and means for feeding said coaxial waveguide with RF electromagnetic energy within said selected frequency range, said coaxial waveguide comprising a generally tubular outer conductor having a longitudinal axis and a coaxially disposed inner conductor, said inner and outer conductors having transverse dimensions selected so that said electromagnetic energy within a selected frequency range will propagate therethrough in the $TE_{11}$ coaxial mode, means for establishing a determinable $TE_{11}$ mode polarization within said waveguide, and means for terminating said coaxial waveguide at both longitudinal ends thereof, and wherein said means for establishing a determinable $TE_{11}$ mode polarization comprises at least two longitudinally extending electrically conductive members disposed at opposed circumferential positions within said waveguide.

5. A slot antenna as set forth in claim 4, wherein said electrically conductive members are connected between said inner and outer conductors so as to electrically short said inner and outer conductors at selected longitudinal positions and thereby establish electromagnetic boundaries within said waveguide.

6. A slot antenna for use in RF broadcasting comprising a coaxial waveguide which is structured and dimensioned so that electromagnetic energy within a selected frequency range will propagate therethrough in the $TE_{11}$ mode and so that said $TE_{11}$ mode will have a determinable mode polarization, said coaxial waveguide having an array of slots formed thereon with said slots being positioned with respect to said mode polarization so that selected polarizations are radiated therefrom, and means for feeding said coaxial waveguide with RF electromagnetic energy within said selected frequency range, said coaxial waveguide comprising a generally tubular outer conductor having a longitudinal axis and a coaxially disposed inner conductor, said inner and outer conductors having transverse dimensions selected so that said electromagnetic energy within a selected frequency range will propagate therethrough in the $TE_{11}$ coaxial mode, means for establishing a determinable $TE_{11}$ mode polarization within said waveguide, and means for terminating said coaxial waveguide at both longitudinal ends thereof, wherein said inner conductor comprises a second generally tubular conductor, and wherein said feed means comprises a third conductor coaxially disposed within said second generally tubular conductor so that said second generally tubular conductor and said third conductor together define a coaxial feed line coaxially disposed within said coaxial waveguide, said third conductor extending at least from one longitudinal end of said antenna to the vicinity of the longitudinal midpoint of said antenna.

7. A slot antenna as set forth in claim 6, wherein said second generally tubular conductor includes at least one transversely extending slot located substantially at the longitudinal midpoint of said antenna for feeding electromagnetic energy from said coaxial feed line to said coaxial waveguide.

8. A slot antenna for use in RF broadcasting comprising a coaxial waveguide which is structured and dimensioned so that electromagnetic energy within a selected frequency range will propagate therethrough in the $TE_{11}$ coaxial mode and so that said $TE_{11}$ mode will have a determinable mode polarization, said coaxial waveguide having an array of slots formed thereon with said slots being positioned with respect to said mode polarization so that selected polarizations are radiated therefrom, and means for feeding said coaxial waveguide with RF electromagnetic energy within said selected frequency range, wherein said coaxial waveguide is provided with both longitudinal and transverse slots so that circularly or elliptically polarized electromagnetic energy is radiated from said slot antenna.

9. A slot antenna for use in RF broadcasting comprising a generally tubular outer conductor having a selected longitudinal length and an array of radiating slots cut therein, a generally tubular middle conductor having the same length as said outer conductor and coaxially disposed therein, means for terminating said outer and middle conductors at the longitudinal ends thereof so that a coaxial waveguide is thereby formed, said outer and middle conductors having transverse dimensions selected so that electromagnetic energy within a selected frequency range will propagate therethrough in the $TE_{11}$ coaxial mode, electrically conductive means disposed at selected longitudinal and circumferential positions within said waveguide so as to establish a known $TE_{11}$ coaxial mode polarization and suppress the TEM mode, and means for feeding electromagnetic energy to said coaxial waveguide, whereby any desired polarization may be radiated by said antenna by positioning and orienting said array of slots with respect to said $TE_{11}$ coaxial mode polarization.

* * * * *